P. SJOSTROM.
MANUAL DRIVING MECHANISM FOR SEWING MACHINES.
APPLICATION FILED MAR. 27, 1915.

1,190,198.

Patented July 4, 1916.

Inventor:
Peter Sjostrom,
by Walter E. Lombard,
Atty.

UNITED STATES PATENT OFFICE.

PETER SJOSTROM, OF MAPLEWOOD, MASSACHUSETTS, ASSIGNOR TO VICTOR SHOE MACHINERY COMPANY, OF BOSTON, MASSACHUSETTS, A CORPORATION OF MASSACHUSETTS.

MANUAL DRIVING MECHANISM FOR SEWING-MACHINES.

1,190,198.      Specification of Letters Patent.      Patented July 4, 1916.

Original application filed February 17, 1915, Serial No. 9,465. Divided and this application filed March 27, 1915. Serial No. 17,942.

*To all whom it may concern:*

Be it known that I, PETER SJOSTROM, a subject of the King of Sweden, and a resident of Maplewood, in the county of Middlesex and State of Massachusetts, have invented certain new and useful Improvements in Manual Driving Mechanism for Sewing-Machines, of which the following is a specification.

This invention relates to driving mechanisms for machines adapted to be actuated by an oscillating shaft, and particularly to that class of driving mechanisms which are adapted to be operated manually.

The object of the present invention is to provide a simple and effective driving mechanism which may be operated manually in repair shops where no power is provided.

The invention consists of certain novel features of construction and arrangement of parts which will be fully understood by reference to the description of the drawings and to the claims hereinafter given.

Figure 2:
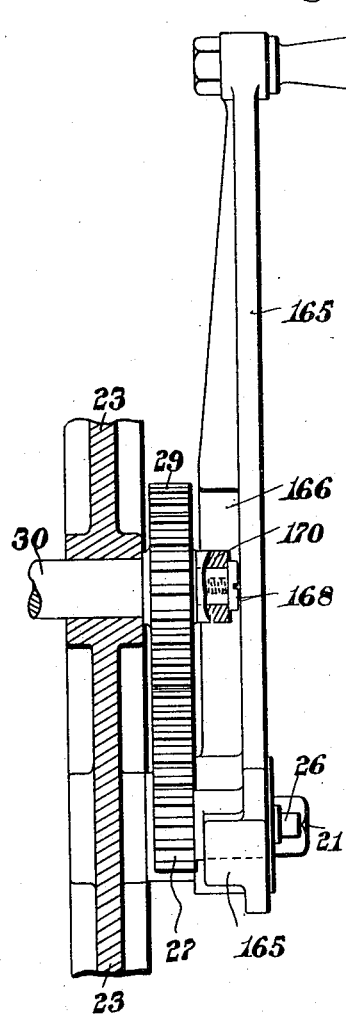
Figure 1:
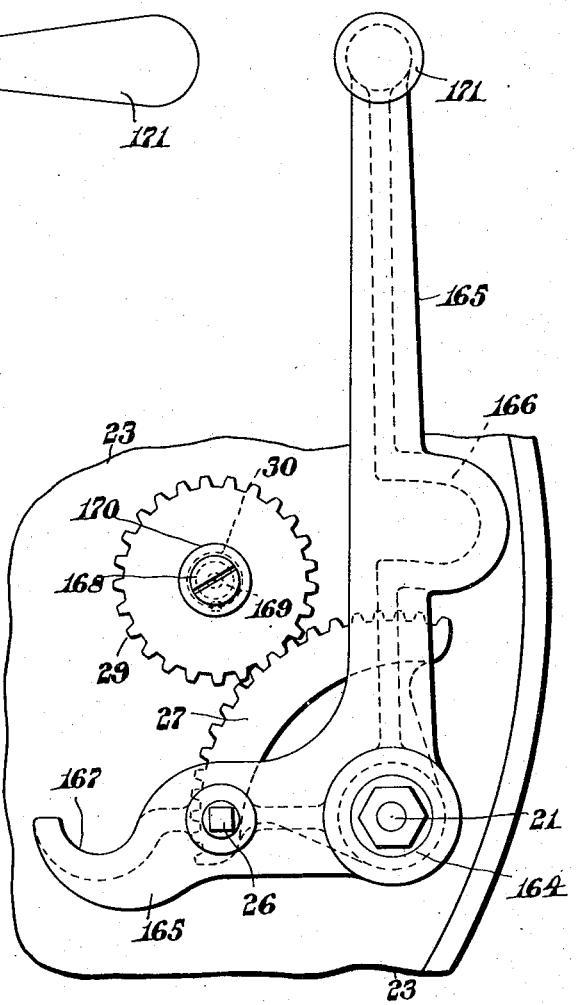

Of the drawings: Figure 1 represents an end elevation of a manually operated driving mechanism embodying the principles of the present invention, and Fig. 2 represents an edge view of the same.

Similar characters designate like parts throughout the several figures of the drawings.

In the drawings, 23 is the frame of a machine such for instance as the sewing machine fully shown and described in another application of mine filed February 17, 1915, and numbered 9,465, of which this application is a division.

In the frame 23 is mounted a shaft 30 adapted to be oscillated in bearings formed in said frame 23. The teeth of a gear segment 27 mesh with the teeth of a gear or pinion 29 secured to said oscillating shaft 30, which segment imparts movement to said gear or pinion 29 when said segment 27 is moved about its pivot 21.

The gear segment 27 is provided with a projecting hub 164 adapted to receive a bell crank lever 165 which is loosely mounted thereon. This lever 165 is secured to the gear segment 27 by means of the member 26, and is adapted to be oscillated about the stud 21 by means of the handle 171 at the upper end thereof.

It is obvious that any oscillation of the lever 165 will impart oscillatory movement to the gear or pinion 29.

The lever 165 is provided with recessed shoulders 166—167 equidistant from the pivot 21, these shoulders being adapted to limit the movement of the lever 165 in either direction in its oscillatory movement by coming in contact with the stop member 168 screwed into a hole 169 in the end of the shaft 30.

The stop member 168 is surrounded by a washer 170 of leather or similar material adapted to deaden the blow when the recessed shoulders 166—167 come into contact therewith.

To oscillate the shaft 30, the operator grasps the handle 171 and moves the lever 165 about its pivot 21 until the shoulder 167 contacts with the stop member 168 and then moves the lever in the opposite direction until the shoulder 166 contacts with said member 168. The continued oscillation of the lever 165 will operate the driving shaft 30 and effect the operation of any mechanisms connected thereto. This makes a very effective driving mechanism for sewing machines and the like installed in small repair shops where no other driving power is provided.

It is believed that the operation and many advantages of this invention will be fully apparent from the foregoing description.

Having thus described my invention, I claim:

1. In a machine of the class described, the combination of an operating shaft; a pinion thereon; a gear segment meshing therewith; a stop member in axial alinement with said shaft; and a handle secured to said segment and adapted to impart oscillating movement thereto provided with shoulders adapted to engage said stop member to limit the movement of said handle in either direction.

2. In a machine of the class described, the combination of an operating shaft; a pinion thereon; a gear segment meshing therewith; a stop member in axial alinement with said shaft; and a handle secured to said segment and adapted to impart oscillating movement thereto provided with recessed shoulders adapted to engage said stop member to limit the movement of said handle in either direction.

3. In a machine of the class described, the combination of an operating shaft; a pinion thereon provided with a stop member; a gear segment meshing with said pinion; and a lever secured to said segment and having means coacting with said stop member for limiting the movement of said lever in opposite directions.

4. In a machine of the class described, the combination of an operating shaft; a pinion thereon provided with a stop member having a cushioned surface; a gear segment meshing with said pinion; and a lever secured to said segment and having means coacting with said stop member for limiting the movement of said lever in opposite directions.

5. In a machine of the class described, the combination of an operating shaft; a pinion thereon; a gear segment meshing therewith; a stop member in axial alinement with said shaft; and a handle secured to said segment and adapted to impart oscillating movement thereto provided with shoulders adapted to engage said stop member to limit the movement of said handle in either direction.

6. In a machine of the class described, the combination of an operating shaft; a pinion thereon; a gear segment meshing therewith; a stop member in axial alinement with said shaft; and a handle secured to said segment and adapted to impart oscillating movement thereto provided with recessed shoulders adapted to engage said stop member to limit the movement of said handle in either direction.

7. In a machine of the class described, the combination of an operating shaft; a pinion thereon provided with a stop member; a gear segment meshing with said pinion; a manually controlled lever secured to said segment; having means thereon coacting with said stop member for limiting the movement of said lever in opposite directions.

8. In a machine of the class described, the combination of an operating shaft; a pinion thereon provided with a stop member having a cushioned surface; a gear segment meshing with said pinion; a lever secured to said segment having means thereon coacting with said stop member for limiting the movement of said lever in opposite directions.

Signed by me at Boston, Mass., this 17th day of March, 1915.

PETER SJOSTROM.

Witnesses:
WALTER E. LOMBARD,
NATHAN C. LOMBARD.

Copies of this patent may be obtained for five cents each, by addressing the "Commissioner of Patents, Washington, D. C."